US011818283B2

(12) United States Patent
Assis Dourado

(10) Patent No.: US 11,818,283 B2
(45) Date of Patent: Nov. 14, 2023

(54) APPARATUS FOR MOBILE COMMUNICATIONS HAVING VARIABLE DIMENSIONS

(71) Applicant: Naxos Finance SA, Luxembourg (LU)

(72) Inventor: Ana Flavia Assis Dourado, Milan (IT)

(73) Assignee: Naxos Finance SA, Luxembourg (LU)

( * ) Notice: Subject to any disclaimer, the term of this patent is extended or adjusted under 35 U.S.C. 154(b) by 0 days.

(21) Appl. No.: 17/599,445

(22) PCT Filed: Mar. 29, 2019

(86) PCT No.: PCT/IB2019/052614
§ 371 (c)(1),
(2) Date: Sep. 28, 2021

(87) PCT Pub. No.: WO2020/201807
PCT Pub. Date: Oct. 8, 2020

(65) Prior Publication Data
US 2022/0182474 A1    Jun. 9, 2022

(51) Int. Cl.
*H04B 7/00* (2006.01)
*H04M 1/02* (2006.01)
*H04M 1/72412* (2021.01)
*H04M 1/72409* (2021.01)

(52) U.S. Cl.
CPC ..... *H04M 1/0256* (2013.01); *H04M 1/72409* (2021.01); *H04M 1/72412* (2021.01)

(58) Field of Classification Search
CPC .. H04M 1/0256; H04M 1/026; H04M 1/0269; H04M 1/72412
See application file for complete search history.

(56) References Cited

U.S. PATENT DOCUMENTS

| 5,635,771 | A  | * | 6/1997  | Mertl    | H02J 7/1423  |
|           |    |   |         |          | 320/DIG. 22  |
| 9,258,523 | B2 | * | 2/2016  | Sobti    | G06F 1/1632  |
| 10,313,435| B2 | * | 6/2019  | Ortiz    | H04L 67/125  |
| 2014/0306981 | A1 | * | 10/2014 | Kobayashi | G09G 3/3406 |
|           |    |   |         |          | 345/589      |
| 2016/0110152 | A1 | * | 4/2016  | Choi     | G06F 3/04817 |
|           |    |   |         |          | 345/2.3      |

OTHER PUBLICATIONS

"Synchronisieren mit iTunes", Apr. 11, 2011, retrieved from the Internet: URL:http://www.edv-buchversand.de/productinfo.php?replace=false&cnt=productinfo&mode=2&type=2&id=or-575&index=2&nr=0&sid=fdcfefc409e35e7cd6889ca06f1c57bc&preload=false&page=1&view=fit&Toolbar=1&pagemode=none, XP055107638 [retrieved on Mar. 13, 2014], p. 323-p. 324. p. 328-p. 332, p. 344-p. 346.

* cited by examiner

*Primary Examiner* — Tuan Pham
(74) *Attorney, Agent, or Firm* — Workman Nydegger

(57) ABSTRACT

An apparatus for communications which can be configured with different dimensions and performance so as to suit different circumstances of use. The apparatus consists of a typical device for wireless communications, such as a smartphone, which can be aggregated with a bigger device offering better fruition of images and videos and better characteristics in terms of battery life, memories, cameras, and the like. The data necessary for the operation of the apparatus and the data of interest for the user are synchronized automatically as aggregation occurs.

14 Claims, 2 Drawing Sheets

APPARATUS FOR MOBILE COMMUNICATIONS HAVING VARIABLE DIMENSIONS

Figure 1:
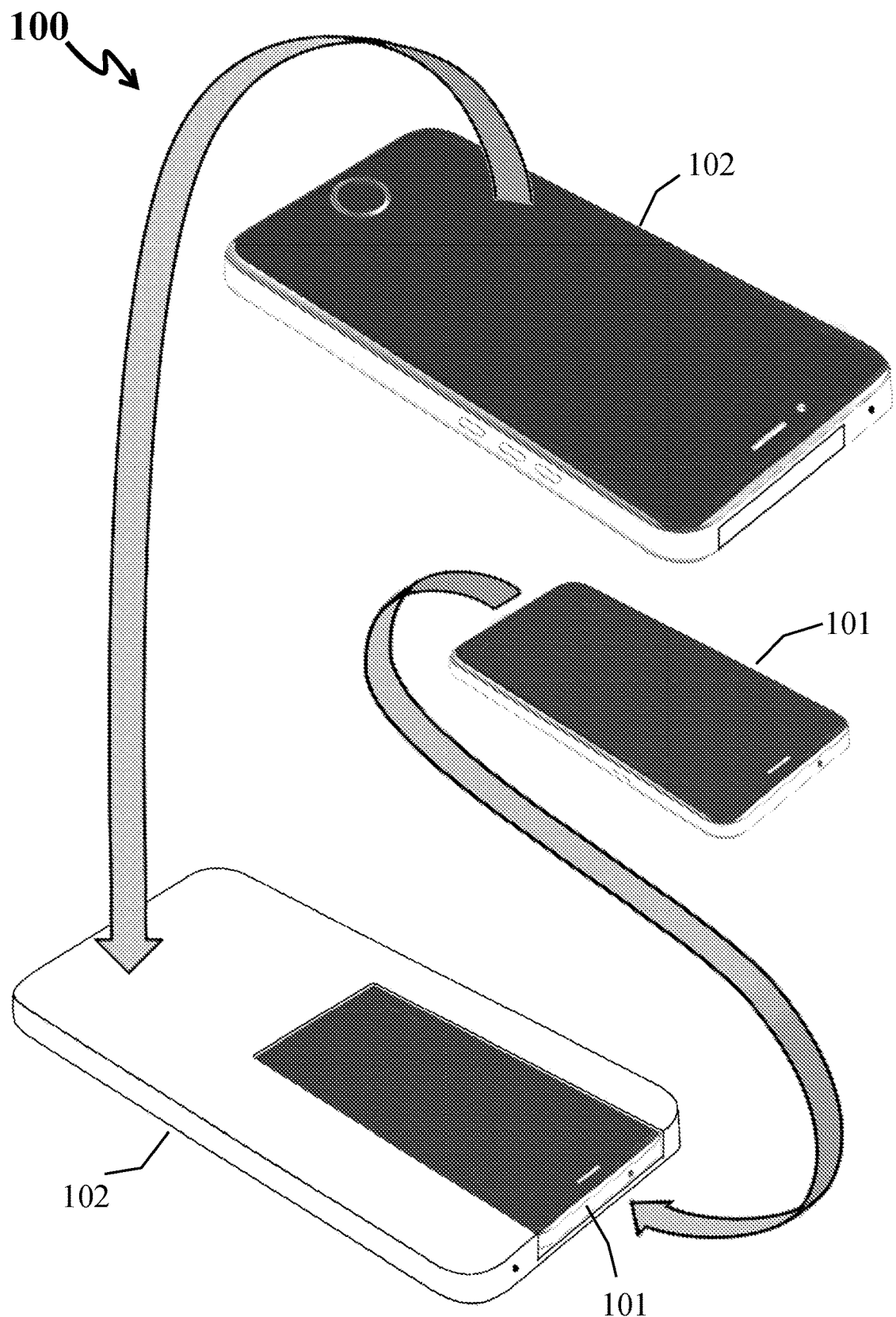

The present invention relates to an apparatus for mobile communications that can be configured with different dimensions and performance, so as to suit different circumstances of use.

On several occasions (work, holidays, parties, etc.), especially when one is wearing clothes and accessories suited to the circumstances, it is convenient to have an appropriately sized mobile phone.

In order to fulfil this need, a person may own more than one phone and use that one which is most appropriate on a particular occasion, by inserting into it the SIM (Subscriber Identification Module) associated with his/her own phone number. In many modern smartphones, however, moving the SIM from one phone to another may be a time-consuming and annoying task, especially when the SIM housings are dedicated to SIMs having different sizes (mini-SIM, micro-SIM, nano-SIM). Moreover, it is necessary to keep the different phones updated with information of interest not stored in the SIM. If such information is stored in an SD Card, the latter will also have to be moved from one phone to the other, and this task may be time-consuming and annoying as well.

Furthermore, telecommunications services are nowadays increasingly available which are provided by means of applications. Such services, which are mostly obtained over WiFi connections, leave no traces on the SIM of the telephone carrier and are not even saved into an SD Card.

As an alternative to using the SD Card, the data may be stored on a "Cloud". However, using a Cloud service requires some skill and data synchronization, and such tasks may be difficult to carry out for some users. Besides, the use of a Cloud system may imply recurrent costs and privacy problems.

If one is satisfied with only two phones to be used alternately, telephone carriers offer a service that allows changing phone easily and immediately without having to move the SIM. In fact, one may request from carriers two different SIMs having the same telephone number, which can be inserted into two different smartphones. One of the two SIMs is set as primary, while the other one is set as secondary. With two phones thus equipped, the cellular network allows making distinct phone calls, even simultaneously. As regards incoming calls, however, if the phone with the primary SIM is reachable, phone calls will only be received on that phone; otherwise (e.g. when the phone with the primary SIM is off), incoming calls will be received by the phone with the secondary SIM. With this solution, in order to use the phone whenever he/she likes, the user can simply turn on the phone that he/she wants to use and leave the other one off. Changing phone is thus very simple and easy, but, as in the preceding solution, there is a need for somehow ensuring data synchronization, e.g. on Cloud, and the communications service provided by the carrier may imply a recurrent additional cost as well as privacy problems. It is also possible to obtain from the telephone carrier a certain number of SIMs (even up to ten) with the same telephone number, allowing all the devices in which they have been inserted to ring simultaneously when there is an incoming call, and making it possible to make calls from any one of such phones, which the called party will identify as coming from said single telephone number.

Nevertheless, the technical problem of these solutions is always the same. Apart from incoming or outgoing calls, there is still the problem that the data in the various devices are not synchronized. In other words, when some multimedia operations are carried out on one of the devices with SIMs having the same telephone number, no traces of such operations will be left in the other devices.

The present invention avoids the need for executing complex operations for synchronizing the data among different apparatuses, and there are no additional recurrent costs nor any privacy problems. It is based, in fact, on the use of a single mobile phone (smartphone), small in size, hereafter referred to as "communications device", equipped with an accessory device, hereafter referred to as "extension device", to be associated with the smartphone to obtain an apparatus having a larger display, wherein the extension device can be used for carrying out all operations that can be executed on the communications device. The extension device comprises input/output means replacing those of the smartphone, which are no longer usable when the two devices are aggregated together.

Aggregation occurs in such a way that the display of the smartphone and that of the extension device will lie on opposite faces of the aggregate apparatus, as shown in the annexed drawing. In this case, the rear camera, with its flash unit, and the rear speaker of the smartphone (communications device) become unusable and are replaced with equivalent, or better, elements of the extension device. Likewise, the extension device can replace the buttons located on unreachable faces of the smartphone, particularly those on the side faces thereof.

In this configuration, the display of the extension device can reproduce, on a larger area, what is being shown on the smartphone's display, or both displays may be used to show different images (e.g. images taken by cameras on opposite faces of the aggregate apparatus).

The connection between the smartphone (communications device) and the extension device may occur by means of the micro-USB port with which smartphones are normally equipped. Such connections may however be also achieved through other methods, for both transferring signals and information from the smartphone to external devices and transferring signals and information from external devices to the smartphone. It is also possible to use, as means for bidirectional communications, wireless means such as Bluetooth and WiFi.

In another embodiment, aggregation of the smartphone (communications device) with the extension device may be accomplished in such a way that the smartphone's display will lie on the same side as that of the extension device, embedded into the body of the latter. In this case, the smartphone's display becomes unusable, while the rear camera and speaker can still be used.

In some embodiments of the invention, the extension device may lack the functionalities of an autonomous communications device, in particular it includes neither any subscriber identification modules nor any transceiving circuits.

In other embodiments, on the contrary, the extension device may comprise transceiving circuits, such as Bluetooth, WiFi, circuits for professional communications systems, etc., and may also comprise circuits for cellular signal transmission/reception, in accordance with various telecommunications standards.

A particularly advantageous feature of the invention is the possibility of automatically synchronizing all the data, or a part thereof, stored in both devices, i.e. updating the data in the extension device according to the data stored in the smartphone (communications device), and vice versa, as soon as the two devices are connected to each other. Due to this synchronization, the user will realize that access to services and processing tasks can be gained through the simple smartphone (communications device) in exactly the same way as required to gain access to the same services and processing tasks through the extension device with the smartphone aggregated therewith, and vice versa.

Moreover, the possibility of practically having two phones with identical functionalities solves also the technical problem that, should the display of either one of the two devices accidentally break, the other one will be immediately ready to perform all the functions of the faulty device.

In other embodiments of the invention, the apparatus for mobile communications of the present invention may comprise two or more extension devices, so as to offer a variety of configurations (smartphone, tablet, laptop) with identical functionalities.

In other embodiments, the apparatus for mobile communications may also comprise two or more personal communications devices that can be coupled to the same extension device, or to more extension devices, so that the members of a family or a group of people can share one or more extension devices through their own personal communications devices. In this case, access to the extension devices may be controlled by means of an account and a password, so as to ensure separation and confidentiality of personal data, applications and preferences, while common applications and data (e.g. Microsoft Office, Google Chrome, etc.) can be jointly updated and used.

The features of the present invention will be more specifically set out in the appended claims.

Figure 2:
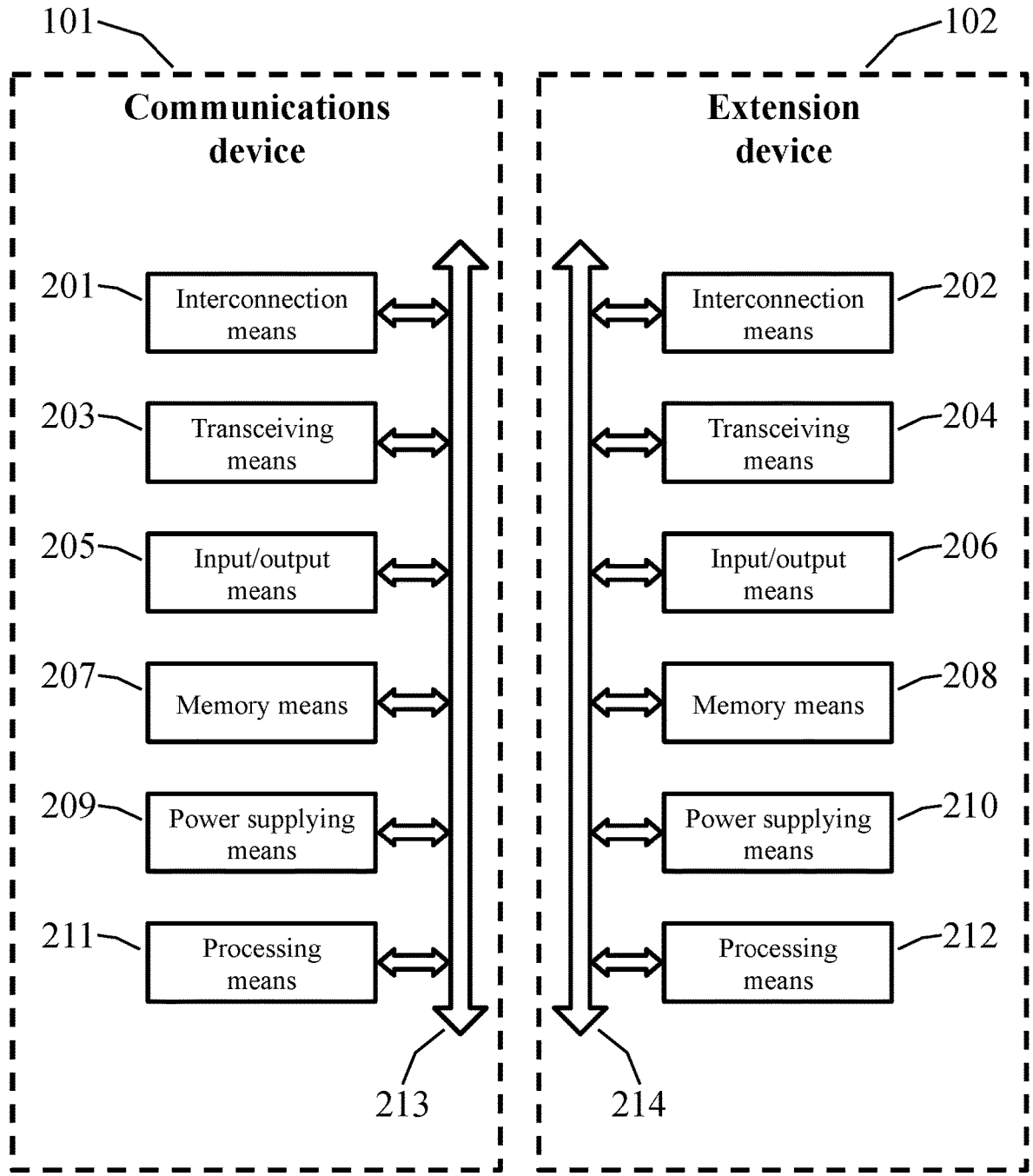

These features as well as further advantages of the present invention will become more apparent from the following description of an embodiment thereof as shown in the annexed drawings, which are supplied by way of non-limiting example, wherein:

FIG. 1 schematically illustrates the coupling of a communications device to an extension device, in accordance with some aspects of the present invention;

FIG. 2 illustrates the architecture of an embodiment of an apparatus for mobile communications in accordance with some aspects of the present invention.

Any reference to "an embodiment" in this description will indicate that a particular configuration, structure or feature is to be considered as comprised in at least one embodiment of the invention. Therefore, the phrase "in an embodiment" and other similar phrases, which may be present in different parts of this description, will not necessarily be all related to the same embodiment. Therefore, the various configurations, structures or features described herein may be combined in one or more embodiments as deemed appropriate.

Finally, it must be pointed out that the alphanumerical references used below are intended to facilitate the understanding of the invention, without limiting the protection scope or the extent of the claimed embodiments.

With reference to FIGS. 1 and 2, the following will describe an apparatus for mobile communications 100, comprising at least one communications device 101, adapted to receive and/or transmit information over a mobile telecommunications network, and at least one extension device 102, suitable for being connected to a communications device 101 capable of synchronizing its contents with those of the extension device 102, and also for improving the visualization performance of the communications device 101.

In some embodiments of the invention, the communications device 101 is a device having the typical features and performance of a smartphone. Therefore, it can provide its user with all the typical telecommunications services of a smartphone, ranging from telephone and messaging services to services available through the Internet. It may also include typical smartphone applications, such as browsers, access to clouds and social networks, music players, image and video players, clock and calendar, software packages for reading and editing documents and processing data, and more. The communications device 101 can therefore be used for the usual communication and processing needs, regardless of the presence of the extension device 102.

The extension device 102 may comprise further elements, including those shown in the diagram of FIG. 2, which shows an example of the elements that the devices of the apparatus for mobile communications 100 according to the present invention may comprise. These are:

interconnection means 201 and 202, for the communications device 101 and the extension device 102, respectively, adapted to implement, detect and signal the interconnection between the communications device 101 and the extension device 102, so that they can interoperate;

transceiving means 203 and 204, for receiving and transmitting information signals;

input/output means 205 and 206, for interacting with a user;

memory means 207 and 208, for storing data necessary for the operation of the apparatus for mobile communications 100 (contained in the two devices 101 and 102) and data of interest for the user of the same;

power supplying means 209 and 210, comprising energy accumulating means, for supplying power to respective electric circuits;

processing means 211 and 212, in communication with the above-mentioned respective means through respective communication buses 213 and 214, and adapted to process data and execute commands and instruction programs.

Interconnection between the devices can be achieved by means of physical links, preferably through micro-USB connectors, or by means of wireless connections, e.g. via Bluetooth, WiFi, or other transceiving systems.

In particular, the connection between the communications device 101 and the extension device 102 may be established by means of a mechanical and electrical connection, when the communications device 101 is housed in a suitable cavity formed in the extension device 102, where input and output electric elements are also provided to allow interconnection with corresponding input/output electric elements (USB—Lightning) contained in the communications device 101.

Said interconnection means may also provide detection of connection and disconnection between communications devices and extension devices. This detection allows data synchronization to be started automatically, which is an advantageous function of the apparatus for mobile communications (100) according to the present invention.

This synchronization may concern data relating to the operation of the apparatus, data of applications installed in its devices, and data of interest and personal data of the user. The set of data to be synchronized, hereafter referred to as "synchronization dataset", may be either defined beforehand by the manufacturer of the apparatus for mobile communications 100 or defined by the user of the same, or may be defined partly by the former and partly by the latter.

Synchronization consists of comparing the data in the synchronization datasets stored in the devices to be synchronized and substituting, or integrating, any old or missing data with the newest data, so that both devices will contain the same data in their synchronization datasets, aligned with the newest values.

Connection or disconnection of the devices can be detected by means of small switches appropriately arranged on the devices' faces contacting each other when the devices are aggregated together, or by means of proximity sensors of various kinds (optical, capacitive, magnetic, ultrasonic, etc.), and in particular by means of sensor types widely used in smartphones for various purposes (turning on/off the hands-free function, display lighting, touchscreen, and more). In case of a physical connection via USB connectors, connection and disconnection can be detected by measuring the voltage levels on the connection lines, as known to those skilled in the art and implemented in many commercial apparatuses. In other words, in order to detect that the two devices are mechanically connected to each other, one may use known techniques commonly employed for coupling a smartphone to a cable plugged into its micro-USB or Lightning (Apple) port.

When the communications device 101 is connected to the extension device 102, the processing means 211 and 212 provide for executing, through the interconnection means 201 and 202, a bidirectional synchronization of the data necessary for the operation of the apparatus for mobile communications 100 and the data of interest for the user of the same, which are contained in the memory means 207 and 208 of both devices 101 and 102 and possibly also in external memory means connected to the communications device 101 or the extension device 102.

Based on data received from the interconnection means 201 and 202, the processing means 211 and 212 can thus automatically start the bidirectional synchronization of the data in the synchronization dataset as soon as a connection is established between the communications device 101 and the extension device 102.

In this manner, once the mechanical/electrical connection between the two devices has been established, such devices will be "clones" of each other.

The transceiving means in the communications device 101 comprise, first of all, at least one transceiver adapted to receive and/or transmit information over a mobile communications network, such as, for example, a cellular network according to one of the 3GPP (3rd Generation Partnership Project) or CDMA (Code Division Multiple Access) standards. Such means may be complemented with WiFi, Bluetooth, NFC and other transceivers.

As regards the extension device 102, in some embodiments of the invention the extension device 102 may comprise transceiving means 204 adapted to receive and transmit information signals through short-range (WiFi, Bluetooth, and the like) or medium or long-range (professional communications systems, cellular systems, and the like) transceiving systems.

WiFi can be used for the interconnection between the two devices, as aforesaid, but it may also be useful to update applications and data, and updates can then be transferred to the communications device 101 by means of the above-described synchronization process. Bluetooth offers simple procedures for sharing images, songs, documents and the like between near devices.

The medium and long-range transmission means that the extension device 102 may comprise are, for example, transceivers for communications systems intended for equipment installation and maintenance technicians, drivers of means of transport, persons responsible for the security of places and people, and other professional and entertainment activities.

Finally, the extension device 102 may comprise transceiving circuits in accordance with one or more standards of the various 3GPP or CDMA generations, and may comprise a user identification module like those known as SIMs or of a different kind. The SIM of the extension device 102 may be independent of that of the communications device 101 or may be its "twin SIM" and have the same telephone number, the same functionalities and the same mobile plan. In this case, the communications device 101 will be given priority when receiving calls and data, but when the user turns off the communications device 101, phone calls and data will be automatically diverted towards the extension device 102. With this variant of the extension device 102, should the communications device 101, i.e. the smartphone, be lost or stolen, the user will immediately have at his/her disposal a cellular apparatus having the same telephone number and containing the same data as the lost device.

The apparatus for mobile communications 100 can therefore be used to advantage for various purposes and activities and in various environments. For example, it can be used in environments where cellular communications are impossible due to absence of radio coverage or forbiddance, while it is however possible to use other communications systems that suit the activity that the user must carry out. With an adequate extension device 102 and data synchronization, as previously described, the user will always have at his/her disposal the data obtained from the synchronization process.

In order to interact with the apparatus user, the communications device 101 and the extension device 102 may comprise all the input/output means that are typically included in smartphones (keys, touchscreen, microphones, speakers, earphone connectors, cameras, proximity sensors, light sensors, vibrators, etc.). When the two devices are aggregated together, some input/output means may in general remain active and operating in parallel, whereas other means of the communications device 101 may be deactivated. For example, the displays for image visualization may remain active in both devices and may possibly be configured to reproduce different images (e.g. images taken by two different cameras), while in the communications device 101 some microphones, the touchscreen functions and other means may be turned off. Activation and deactivation of the input/output means may be, at least partly, set beforehand according to the mechanical configuration of the aggregation, while some activations and deactivations may depend on user-defined settings (e.g. deactivation of the display of the communications device 101).

In any case, the processing means 211 and 212 may be configured to handle the input/output means 205 and 206 of the communications device 101 and of the extension device 102 in such a way as to allow a user to use them in a combined manner, or at least partly so.

Each one of the devices included in the apparatus for mobile communications 100 comprises power supplying means of its own, in particular dedicated energy accumulating means that can be recharged independently.

In some embodiments of the invention, the processing means 211 and 212 are configured to regulate the transfer of energy from the power supplying means 210 of the extension device 102 to the power supplying means 209 of the communications device 101.

Such transfer of energy is regulated in a manner such as to give priority to the charging of the energy accumulating means comprised in the power supplying means 209 of the communications device 101 over the charging of the energy accumulating means comprised in the power supplying means 210 of the extension device 102, possibly while subtracting energy from the energy accumulating means of the extension device 102. This is useful to keep the energy accumulating means of the communications device 101 always fully charged, and to advantageously minimize the capacity requirements, and hence the dimensions and weight, of the communications device 101.

In this respect, it must be pointed out that the dimensions of the communications device 101 can be much smaller than those of the extension device 102.

In one embodiment of the invention, the apparatus for mobile communications 100 may comprise a communications device 101 and a plurality of extension devices 102, and the communications device 101 may be aggregated with any one of the devices of the plurality of extension devices 102. The extension devices 102 may have different dimensions and/or performance, so that the apparatus for mobile communications 100 can be used with flexibility in various configurations and various circumstances, for different activities (spare time, holidays, professional activities) and in various environments.

In this case as well, the above-described data synchronization advantageously makes all the data and the preferences set by the user immediately available to the communication means, which are suitable for both professional and non-professional use.

The communications device 101 can, in fact, act as a reference and, when it connects to an extension device 102, it can transfer thereto the acquired data updates, while it can receive from it any updates that the extension device 102 may have received by other means, without being connected to the communications device 101.

In another embodiment of the invention, the apparatus for mobile communications 100 may comprise an extension device 102 and a plurality of communications devices 101, and the extension device 102 may be aggregated with any one of the devices of the plurality of communications devices 101. In this case, the members of a family, or the members of a workgroup, may advantageously share the use of the extension device 102 through their own personal communications device 101. Access to the extension device 102 may be controlled by means of an account and a password, which identify the authorized members, so that the latter can use distinct areas of the memory means 208. Synchronization of the data of the individual members may occur separately for each one of them, in compliance with confidentiality requirements.

In another embodiment of the invention, the apparatus for mobile communications 100 may comprise both a plurality of communications devices 101 and a plurality of extension devices 102, and any one of the devices of the plurality of communications devices 101 can be aggregated with any one of the devices of the plurality of extension devices 102, so that the members of a family, or the members of a workgroup, can advantageously share the use of multiple extension devices 102, each one by means of his/her own personal communications device 101, in the same way as previously described with reference to the case wherein there is only one common extension device 102.

In the last two embodiments mentioned herein, when a communications device 101, belonging to a plurality of communications devices 101, is connected to an extension device 102, whether or not belonging to a plurality of extension devices 102, prior to synchronization of the two devices an access password is asked, which will produce the synchronization of only a part of the data contained in said memory means, i.e. the data related to that particular communications device 101 of the plurality of communications devices 101 that can be connected to the extension device 102.

Although this description has tackled some of the possible variants of the present invention, it will be apparent to those skilled in the art that other embodiments may also be implemented, wherein some elements may be replaced with other technically equivalent elements. The present invention is not therefore limited to the illustrative examples described herein, since it may be subject to many modifications, improvements or replacements of equivalent parts and elements without departing from the basic inventive idea, as set out in the following claims.

The invention claimed is:

1. An apparatus for mobile communications comprising:
   at least one communications device, adapted to receive and/or transmit information over a mobile telecommunications network, and
   at least one extension device, adapted to be connected to said at least one communications device and to extend the performance thereof,
   wherein said at least one communications device and said at least one extension device each comprise:
   interconnection means, adapted to implement, detect and signal the interconnection between said at least one communications device and said at least one extension device,
   a plurality of input/output features,
   memory means for storing data necessary for the operation of said apparatus for mobile communications and data of interest for the user of the same,
   power supplying means, comprising energy accumulating means, for supplying power to respective electric circuits, and
   processing means, in communication with said respective means through a communication bus, and adapted to process data and execute commands and instruction programs,
   wherein when said at least one communications device is connected to said at least one extension device, said processing means are configured to clone said devices each other by executing, through said interconnection means, a bidirectional synchronization of said data necessary for the operation of said apparatus for mobile communications and said data of interest for the user of the same, contained in said memory means of both of said devices, and
   wherein when said at least one communications device is connected to said at least one extension device, at least one or more of said plurality of input/output features of said at least one communications device and said at least one extension device remain active and operate in parallel while at least one or more of said plurality of input/output features of said at least one communications device is automatically deactivated.

2. The apparatus for mobile communications according to claim 1, wherein said processing means, based on data received from said interconnection means that are configured to detect the connection thereof, are configured for automatically starting said bidirectional synchronization as soon as a connection is established between said at least one communications device and said at least one extension device.

3. The apparatus for mobile communications according to claim 1, wherein said processing means are configured to adapt, through said input/output means, said at least one communications device and at least one extension device to allow a user to use them, at least partly, in a combined manner.

4. The apparatus for mobile communications according to claim 1, wherein said connection between said at least one communications device and said at least one extension device is established by means of a mechanical and electrical connection when said at least one communications device is housed in a suitable cavity formed in said at least one extension device, where input and output electric elements are also provided which allow interconnection with corresponding input and output electric elements contained in said at least one communications device.

5. The apparatus for mobile communications according to claim 1, wherein said processing means are configured to regulate the transfer of energy from said power supplying means of said at least one extension device to said power supplying means of said at least one communications device.

6. The apparatus for mobile communications according to claim 5, wherein said transfer of energy from said power supplying means of said at least one extension device to said power supplying means of said at least one communications device is regulated to give priority to the charging of said energy accumulating means comprised in said power supplying means of said at least one communications device over the charging of said energy accumulating means comprised in said power supplying means of said at least one extension device.

7. The apparatus for mobile communications according to claim 1, wherein said at least one extension device comprises transceiving means adapted to receive and transmit information signals through at least one short-range or medium or long-range transceiving system.

8. The apparatus for mobile communications according to claim 1, comprising a plurality of extension devices, wherein said at least one communications device can be aggregated with any one of the devices of said plurality of extension devices.

9. The apparatus for mobile communications according to claim 1, comprising a plurality of communications devices, wherein said at least one extension device can be aggregated with any one of the devices of said plurality of communications devices.

10. The apparatus for mobile communications according to claim 8, comprising a plurality of communications devices and a plurality of extension devices, wherein any device of said plurality of communications devices can be aggregated with any one of the devices of said plurality of extension devices.

11. The apparatus for mobile communications according to claim 9, wherein, when a communications device, belonging to said plurality of communications devices, is connected to said at least one extension device, whether or not belonging to a plurality of extension devices, prior to starting the synchronization of the two devices an access password is asked, which will produce the synchronization of only a part of the data contained in said memory means.

12. The apparatus for mobile communications according to claim 1, wherein said at least one communications device has a SIM associated with a telephone number and wherein said at least one extension device has a SIM associated with the same telephone number.

13. The apparatus for mobile communications according to claim 1, wherein connection or disconnection between said at least one communications device and said at least one extension device is detected by a proximity sensor.

14. The apparatus for mobile communications according to claim 1, wherein said data necessary for the operation of said apparatus for mobile communications and said data of interest for the user of the same is contained in external memory connected to said at least one communications device or said at least one extension device.

* * * * *